US009267217B2

(12) United States Patent
Kamachi et al.

(10) Patent No.: US 9,267,217 B2
(45) Date of Patent: Feb. 23, 2016

(54) PRODUCTION METHOD FOR R—FE—B BASED SINTERED MAGNET HAVING PLATING FILM ON SURFACE THEREOF

(75) Inventors: Masanao Kamachi, Saitama (JP); Koshi Yoshimura, Hyogo (JP); Takahiro Isozaki, Saitama (JP)

(73) Assignee: HITACHI METALS, LTD., Tokyo (JP)

( * ) Notice: Subject to any disclaimer, the term of this patent is extended or adjusted under 35 U.S.C. 154(b) by 257 days.

(21) Appl. No.: 13/984,943

(22) PCT Filed: Jan. 4, 2012

(86) PCT No.: PCT/JP2012/050002
§ 371 (c)(1),
(2), (4) Date: Aug. 12, 2013

(87) PCT Pub. No.: WO2012/111353
PCT Pub. Date: Aug. 23, 2012

(65) Prior Publication Data

US 2013/0313125 A1 Nov. 28, 2013

(30) Foreign Application Priority Data

Feb. 15, 2011 (JP) ................................ 2011-029986

(51) Int. Cl.
*B01J 19/08* (2006.01)
*B01J 19/10* (2006.01)
(Continued)

(52) U.S. Cl.
CPC ................ *C25D 7/001* (2013.01); *C23G 1/085* (2013.01); *C23G 1/24* (2013.01); *C25D 5/34* (2013.01); *C25D 17/16* (2013.01); *H01F 41/026* (2013.01); *C25D 3/12* (2013.01); *H01F 1/0577* (2013.01)

(58) Field of Classification Search
CPC ............ C25D 5/36; C25D 7/001; C23G 1/24; C23G 1/085
See application file for complete search history.

(56) References Cited

U.S. PATENT DOCUMENTS

2010/0330361 A1* 12/2010 Yoshida et al. ............... 428/336

FOREIGN PATENT DOCUMENTS

CN 1607268 A 4/2005
JP 60-140713 A 7/1985
(Continued)

OTHER PUBLICATIONS

Machine translation of Japanese Patent Publication No. 07-230928.*
International Search Report for International Application No. PCT/JP2012/050002 dated Feb. 7, 2012.
Chinese Second Office Action issued on Jun. 4, 2015 to the corresponding Chinese patent application No. 20128008753.6.

*Primary Examiner* — Michael Wieczorek
(74) *Attorney, Agent, or Firm* — Kratz, Quintos & Hanson, LLP

(57) ABSTRACT

An object of the present invention is to provide a production method for an R—Fe—B based sintered magnet having a plating film excellent in adhesiveness on the surface thereof, by conducting a series of processes of acid cleaning and smut removal as pretreatments of an R—Fe—B based sintered magnet, and the subsequent plating treatment effectively without causing trouble. The production method of the present invention includes a series of processes of acid cleaning and smut removal of a magnet as pretreatments, and the subsequent plating treatment is conducted consistently with a state, in which the magnet is placed in a barrel made of synthetic resin. The smut removal is conducted by ultrasonic cleaning of the magnet with rotating the barrel in water in which the dissolved oxygen amount is set to 0.1 ppm to 6 ppm by degassing.

3 Claims, 2 Drawing Sheets

(51) Int. Cl.

| | |
|---|---|
| ***C25D 7/00*** | (2006.01) |
| ***C25D 5/34*** | (2006.01) |
| ***C23G 1/24*** | (2006.01) |
| ***H01F 41/02*** | (2006.01) |
| ***C25D 17/16*** | (2006.01) |
| ***C23G 1/08*** | (2006.01) |
| *H01F 1/057* | (2006.01) |
| *C25D 3/12* | (2006.01) |

(56) References Cited

FOREIGN PATENT DOCUMENTS

| | | | |
|---|---|---|---|
| JP | H1-286407 | | 11/1989 |
| JP | H4-283911 | | 10/1992 |
| JP | 07-230928 | A | 8/1995 |
| JP | 11-354361 | A | 12/1999 |
| JP | 2004-289021 | A1 | 10/2004 |

* cited by examiner

PRODUCTION METHOD FOR R—FE—B BASED SINTERED MAGNET HAVING PLATING FILM ON SURFACE THEREOF

TECHNICAL FIELD

The present invention relates to a production method for an R—Fe—B based sintered magnet having a plating film on the surface thereof.

BACKGROUND ART

An R—Fe—B based sintered magnet, as represented by an Nd—Fe—B based sintered magnet, has high magnetic characteristics, and thus is used today in various fields. However, because an R—Fe—B based sintered magnet contains a highly reactive rare earth element, R, it is easily oxidized and corroded in the atmosphere. When it is used without any surface treatment, the corrosion progresses from the surface by the existence of small amounts of an acid, an alkali, moisture, or the like, whereby rusting occurs causing deterioration or fluctuation in the magnetic characteristics. Further, there is a risk that rust is dispersed and contaminates peripheral parts when such a rusted magnet is incorporated into a device such as a magnetic circuit. Thus, with the purpose of giving the corrosion resistance to an R—Fe—B based sintered magnet, a method to form a plating film on the surface of a magnet is widely employed, as it is well known.

As the plating film formed on the surface of an R—Fe—B based sintered magnet, for example, a copper plating film, a nickel plating film, and the like are mentioned. These plating films can be formed by an electrolytic plating treatment or a non-electrolytic plating treatment, but, in the case when any of the plating films is formed, cleaning (acid cleaning) using an inorganic acid or an organic acid to remove processed deformed layer and sintered deformed layer existing on the surface of the magnet is conducted as a pretreatment before the plating treatment. After this, the removal of infusible residues, which are attached to the surface of the magnet by the acid cleaning and are called smuts, is conducted because a plating film excellent in adhesiveness cannot be formed when the plating treatment is conducted to the magnet, to which smuts remain attached.

As the method for removing smuts attached to the surface of the R—Fe—B based sintered magnet after the acid cleaning, and forming a plating film excellent in adhesiveness, for example, Patent Document 1 proposes a method: in which the magnet is placed in a barrel for plating; an electrolytic treatment is conducted with rotating the barrel in an alkaline electrolytic solution; and then a plating treatment is conducted without taking the magnet out of the barrel. In this method, smut removal is conducted using the force associated with the desorption of oxygen gas or hydrogen gas, which generates from the surface of the magnet by the electrolytic treatment from the surface of the magnet. The method can be appreciated in that the plating treatment can be conducted without the necessity of transferring the magnet after smuts are removed. However, by the analysis of the present inventors, it was found that, in this method, an oxide film or a hydroxide film is thought to be formed on the surface of the magnet with the generation of oxygen gas; thus, it is difficult to form a plating film excellent in adhesiveness on the surface of the magnet. This tendency is remarkable, especially when a plating treatment using a highly alkaline plating bath is conducted. Further, Patent Document 1 describes a method to remove smuts by conducting acid cleaning of the magnet placed in a mesh basket and then subsequently conducting ultrasonic cleaning, as prior art. This method however, does not have a sufficient effect of removing smuts and causes trouble because it is necessary to transfer the magnet from the mesh basket to a barrel for plating for the plating treatment, as described in Patent Document 1.

PRIOR ART DOCUMENTS

Patent Documents

Patent Document 1: JP-A-H7-230928

SUMMARY OF THE INVENTION

Problems that the Invention is to Solve

Thus, the present invention aims to provide a production method for an R—Fe—B based sintered magnet having a plating film excellent in adhesiveness on the surface thereof, by conducting a series of processes of acid cleaning and smut removal as pretreatments of a plating treatment of an R—Fe—B based sintered magnet, and the subsequent plating treatment, effectively without causing trouble.

Means for Solving the Problems

The present inventors conducted intensive studies in view of the above points, and as a results found that a plating film excellent in adhesiveness can be formed on the surface of an R—Fe—B based sintered magnet without causing trouble by conducting a series of processes of acid cleaning and smut removal as pretreatments of a plating treatment of the magnet, and the subsequent plating treatment consistently with a state in which the magnet is placed in a barrel made of synthetic resin used as a barrel for plating. That is, without taking the magnet out of the barrel, and conducting the smut removal by ultrasonic cleaning of the magnet with rotating the barrel in degassed water in which the dissolved oxygen amount is reduced to a predetermined value.

The production method for an R—Fe—B based sintered magnet having a plating film on the surface thereof of the present invention made based on the above knowledge is, according to a first embodiment, characterized in that a series of processes of acid cleaning and smut removal of a magnet as pretreatments of a plating treatment, and the subsequent plating treatment is conducted consistently with a state, in which the magnet is placed in a barrel made of synthetic resin, and the smut removal is conducted by ultrasonic cleaning of the magnet with rotating the barrel in water in which the dissolved oxygen amount is set to 0.1 ppm to 6 ppm by degassing.

Further, the production method according to a second embodiment is characterized in that in the production method of the first embodiment, an oscillation frequency of ultrasonic wave in the ultrasonic cleaning is set to 20 kHz to 100 kHz.

In addition, the production method according to a third embodiment is characterized in that in the production method of the first embodiment, pH of a plating bath in the plating treatment is 9 or more.

Effect of the Invention

According to the present invention, a production method for an R—Fe—B based sintered magnet having a plating film excellent in adhesiveness on the surface thereof can be provided by conducting a series of processes of acid cleaning and smut removal as pretreatments of a plating treatment of an R—Fe—B based sintered magnet, and the subsequent plating treatment, effectively without causing trouble.

MODE FOR CARRYING OUT THE INVENTION

Figure 1:
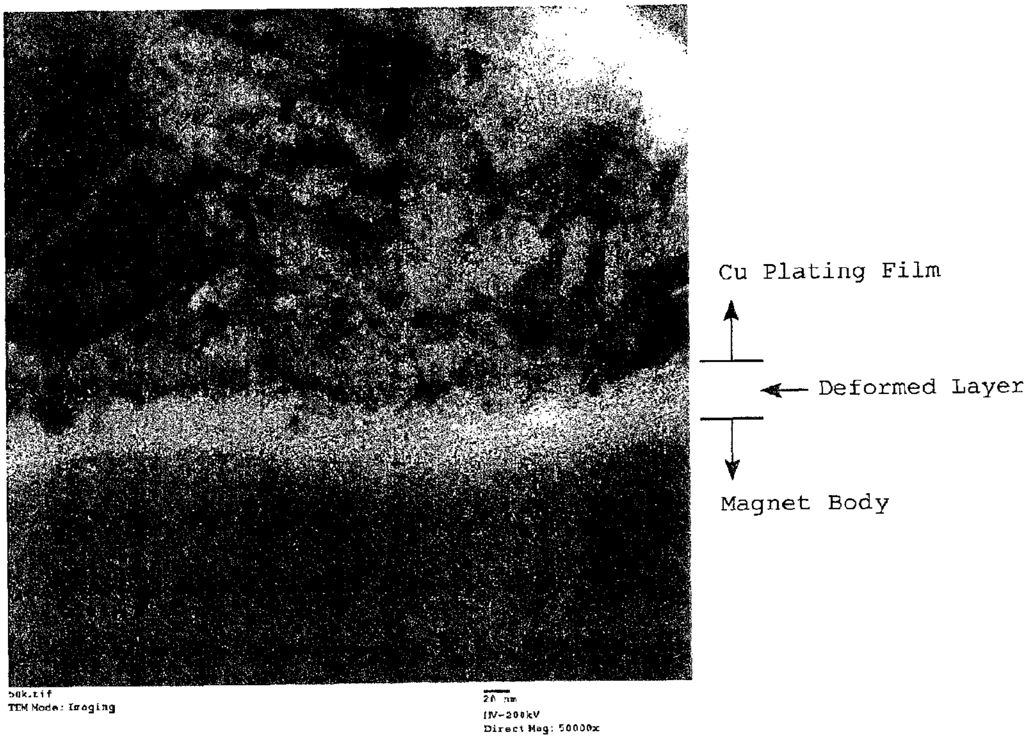
FIG. 1 It is a cross-section picture by a transmission electron microscope around the boundary surface of the magnet body and the copper plating film of the magnet of Example 2.

The production method for an R—Fe—B based sintered magnet having a plating film on the surface thereof of the present invention is characterized in that a series of processes of acid cleaning and smut removal of a magnet as pretreatments of a plating treatment, and the subsequent plating treatment is conducted consistently with a state, in which the magnet is placed in a barrel made of synthetic resin, and that the smut removal is conducted by ultrasonic cleaning of the magnet with rotating the barrel in water in which the dissolved oxygen amount is set to 0.1 ppm to 6 ppm by degassing. Each process is explained step by step below.

First, the R—Fe—B based sintered magnet to be treated is placed in a barrel made of synthetic resin, and acid cleaning of the magnet is conducted. Regarding the barrel made of synthetic resin, any material and any shape are accepted as long as the barrel can be used as a barrel for plating in the plating treatment conducted subsequently. For example, those in a hexagonal prism shape or a cylinder shape made of vinyl chloride resin are exemplified. The acid cleaning of the magnet may be conducted by immersing the barrel containing the magnet in an acid cleaning solution, with rotating the barrel. The rotating speed of the barrel can be decided appropriately based on the size of the barrel, the size of the magnet, the number of the magnets placed in the barrel, and the like. The speed of 2 rpm to 10 rpm is exemplified. The concentration of the acid of the acid cleaning solution is, for example, 1% to 10%. The acid may be an inorganic acid or an organic acid, and the acid can be used alone or some kinds can be mixed and used. As the inorganic acid, hydrochloric acid, sulfuric acid, nitric acid, phosphoric acid, and the like are exemplified. As the organic acid, citric acid, tartaric acid, oxalic acid, acetic acid, gluconic acid and, the like are exemplified. As the organic acid, those in the form of a salt such as sodium salt, potassium salt, and the like may be used. The time of the acid cleaning is, for example, 1 minute to 10 minutes.

Next, the removal of smuts attached to the surface of the magnet is conducted by immersing the barrel containing the magnet after the acid cleaning in water, in which the dissolved oxygen amount is set to 0.1 ppm to 6 ppm by degassing, and conducting ultrasonic cleaning of the magnet with rotating the barrel. The point to be cared here is that the reduction of the dissolved oxygen amount has to be conducted by degassing. Although the reduction of the dissolved oxygen amount can be conducted also by bubbling nitrogen gas, argon gas, or the like and replacing oxygen in water with such a gas, smut removal cannot be conducted effectively with this method (that is, the aimed effect cannot be achieved with an embodiment in which the dissolved oxygen amount is reduced but the dissolved amount of other gasses is increased instead). The reason why the dissolved oxygen amount in degassed water is determined to 0.1 ppm to 6 ppm is that when the dissolved oxygen amount is too low, babbles arising by cavitation, which are necessary for the ultrasonic cleaning of the magnet, are too few and smuts cannot be removed effectively. On the other hand, when the dissolved oxygen amount is too high, smuts cannot be removed effectively either because the ultrasonic energy propagation is prevented and reduced. The dissolved oxygen amount in degassed water is preferably 1 ppm to 5 ppm, more preferably 2 ppm to 4 ppm, and most preferably 3 ppm to 4 ppm. Incidentally, the method for degassing is not particularly restricted and methods known per se can be used. Specifically, the widely-used vacuum degassing method and the like can be used, as well as the method using the degassing device described in Japanese Patent No. 4159574, and the method using the degassing system described in JP-A-2004-249215.

The ultrasonic cleaning of the magnet can be conducted with rotating the barrel containing the magnet in degassed water with the dissolved oxygen amount of 0.1 ppm to 6 ppm and with generating ultrasonic wave using an ultrasonic transducer placed in the water. The rotating speed of the barrel can be decided appropriately based on the size of the barrel, the size of the magnet, the number of the magnets placed in the barrel, and the like. The speed of 2 rpm to 10 rpm is exemplified. In order to remove smuts effectively, the oscillation frequency of the ultrasonic wave is preferably 20 kHz to 100 kHz, more preferably 21 kHz to 50 kHz, even more preferably 22 kHz to 40 kHz, and most preferably 25 kHz to 35 kHz. The time of the ultrasonic cleaning is, for example, 1 minute to 10 minutes.

Finally, a plating treatment is conducted to the magnet after smut removal and a plating film is formed on the surface thereof. The plating treatment can be conducted, for example, by immersing the barrel containing the magnet after the smut removal in a plating bath, with rotating the barrel. The rotating speed of the barrel can be decided appropriately based on the size of the barrel, the size of the magnet, the number of the magnets placed in the barrel, and the like. The speed of 2 rpm to 10 rpm is exemplified. The plating bath can be a known bath, for example for copper plating or nickel plating, and can be a bath for conducting an electrolytic plating treatment or a bath for conducting a non-electrolytic plating treatment. Further, the condition for the plating treatment can also be a known condition. However, according to the method of the present invention, a plating film excellent in adhesiveness can be formed on the surface of the magnet, even when the plating treatment using a highly alkaline plating bath, with which a plating film excellent in adhesiveness cannot be formed on the surface of the magnet by the method described in Patent Document 1, is conducted. Thus, the method of the present invention is applied favorably for the cases to conduct a plating treatment using a plating bath with pH 9 or more, for example. As specific examples of the plating treatment using a plating bath with pH 9 or more, the electrolytic copper plating treatments that are described in JP-A-2002-332592, JP-A-2004-137533, Japanese Patent No. 3972111, Japanese Patent No. 4033241, and the like, etc. are mentioned. For the film thickness of the plating film formed on the surface of the magnet by the plating treatment, 1 μm to 30 μm is exemplified.

Incidentally, the smut removal process does not necessarily have to be conducted subsequently and continuously to the acid cleaning process, and an additional cleaning process and the like can be conducted between both processes. Similarly, an additional cleaning process and the like can be conducted also between the smut removal process and the plating treatment process.

The rare earth element (R) in the R—Fe—B based sintered magnet used in the present invention includes at least Nd, it may also include at least one kind of Pr, Dy, Ho, Tb and Sm, and may further include at least one kind of La, Ce, Gd, Er, Eu, Tm, Yb, Lu and Y. Further, one kind of R is usually sufficient, but a mixture of two or more kinds (misch metal, didym or the like) can be used in practice with the reasons such as the availability. With respect to the content of R in the R—Fe—B based sintered magnet, when it is less than 10 at %, the crystal structure is a cubic crystal structure that is the same structure as α-Fe, and thus high magnetic characteristics, especially high magnetic coersive force ($H_{cj}$) cannot be achieved. Meanwhile, when the content exceeds 30 at %, an R-rich non-magnetic phase becomes larger, the residual magnetic flux density ($B_r$) decreases, and thus a permanent magnet with excellent characteristics cannot be obtained. Accordingly, it is desirable that the content of R is 10 at % to 30 at % of the composition.

With respect to the content of Fe, when it is less than 65 at %, the $B_r$ decreases. Meanwhile, when the content exceeds 80 at %, high $H_{cj}$ cannot be achieved. Accordingly, it is desirable that the content of Fe is 65 at % to 80 at %. Further, by substituting a part of Fe with Co, the temperature characteristics of the resulting magnet can be improved without impairing its magnetic characteristics. However, when the substitution amount with Co exceeds 20 at % of Fe, the magnetic characteristics are impaired, and thus it is not desirable. When the substitution amount with Co is 5 at % to 15 at %, the $B_r$ increases compared with the case without substitution, and thus it is desirable to obtain a high magnetic flux density.

With respect to the content of B, when it is less than 2 at %, the $R_2Fe_{14}B$ phase, which is the main phase, becomes smaller, and high $H_{cj}$ cannot be achieved. Meanwhile, when the content exceeds 28 at %, a B-rich non-magnetic phase becomes larger, the $B_r$ decreases, and thus a permanent magnet with excellent characteristics cannot be obtained. Accordingly, it is desirable that the content of B is 2 at % to 28 at %. Further, for the improvement of the productivity and the price reduction of the magnet, at least one kind of P and S can be contained in the magnet in a total amount of 2.0 wt % or less. In addition, the corrosion resistance of the magnet can be improved by substituting a part of B with C in an amount of 30 wt % or less.

Furthermore, the addition of at least one kind of Al, Ti, V, Cr, Mn, Bi, Nb, Ta, Mo, W, Sb, Ge, Sn, Zr, Ni, Si, Zn, Hf and Ga is effective for the improvement of the magnetic coercive force or the squareness of the demagnetization curve, the improvement of the productivity, and the price reduction. Incidentally, the R—Fe—B based sintered magnet may also contain impurities, which are unavoidable in the industrial production, in addition to R, Fe, B and other elements that can be contained.

Incidentally, another corrosion-resistant film may further be laminated and formed on the surface of the plating film formed on the surface of the R—Fe—B based sintered magnet by the method of the present invention. By employing such a constitution, the characteristics of the plating film can be enhanced/complemented, or further functionalities can be imparted.

EXAMPLES

The present invention is explained in detail with Examples below, but the present invention is not interpreted restrictively to the following descriptions.

Example 1

410 sintered magnets having the size of length: 10 mm×width: 10 mm×height: 20 mm, the weight of 15 g and the composition of 30.9 Nd-68.0 Fe-1.1 B (wt %) were placed in a barrel for plating in a hexagonal prism shape made of vinyl chloride resin, having the total length: 500 mm×diagonal length: 250 mm and having liquid passage holes with the hole size of 5 mm. After then, acid cleaning for removing processed deformed layer and sintered deformed layer existing on the surfaces of the magnets was conducted for 3 minutes, by immersing them in 3% nitric acid and with rotating the barrel with a rotating speed of 3 rpm.

After taking the barrel out of the acid cleaning solution and immersing it in a water bath to conduct water cleaning of the magnets, the barrel was immersed in degassed water having the dissolved oxygen amount of 4 ppm prepared using the degassing device described in Japanese Patent No. 4159574 (the dissolved oxygen amount was measured using the measuring device: HORIBA DOMETER OM-51 of HORIBA, Ltd., the same is applied in the below). Ultrasonic cleaning was conducted for 2 minutes with rotating the barrel with a rotating speed of 3 rpm and with generating ultrasonic waves of 25 kHz using an ultrasonic transducer placed in the degassed water, and thus smuts attached to the surfaces of the magnets were removed.

After taking the barrel out of the degassed water, it was immersed in an electrolytic nickel plating bath (nickel sulfate: 250 g/L, nickel chloride: 45 g/L, boric acid: 30 g/L, pH: 4.2 and the liquid temperature: 50° C.), an electrolytic plating treatment was conducted for 3.5 hours with rotating the barrel with a rotating speed of 3 rpm and with a current density of 0.35 A/dm$^2$. A nickel plating film with the film thickness of 20 μm was formed on the surfaces of the magnets.

Comparative Example 1

Except that smuts were removed by conducting an electrolytic treatment according to Patent Document 1, a nickel plating film was formed on the surfaces of the magnets similarly to Example 1. The electrolytic treatment was conducted for 3 minutes by immersing the barrel in an alkaline electrolytic solution (sodium hydroxide: 70 g/L, sodium carbonate: 30 g/L, phosphate: 10 g/L and the liquid temperature: 30° C.) and with rotating the barrel with a rotating speed of 3 rpm, and with a current density of 3 A/dm$^2$.

Comparative Example 2

Except that smuts were removed by conducting ultrasonic cleaning using ion-exchanged water (the dissolved oxygen amount was 8 ppm), a nickel plating film was formed on the surfaces of the magnets similarly to Example 1.

Comparative Example 3

Except that smuts were removed by conducting ultrasonic cleaning using water in which the dissolved oxygen amount was set to 3 ppm by babbling argon gas, a nickel plating film was formed on the surfaces of the magnets similarly to Example 1.

Example 2

410 sintered magnets having the size of length: 10 mm×width: 10 mm×height: 20 mm, the weight of 15 g and the composition of 30.9 Nd-68.0 Fe-1.1 B (wt %) were placed in a barrel for plating in a hexagonal prism shape made of vinyl chloride resin having the total length: 500 mm×diagonal length: 250 mm and having liquid passage holes with the hole size of 5 mm. Then, acid cleaning for removing processed deformed layer and sintered deformed layer existing on the surfaces of the magnets was conducted for 3 minutes by immersing them in 3% nitric acid and with rotating the barrel with a rotating speed of 3 rpm.

After taking the barrel out of the acid cleaning solution and immersing it in a water bath to conduct water cleaning of the magnets, the barrel was immersed in degassed water having the dissolved oxygen amount of 3 ppm prepared using the degassing device described in Japanese Patent No. 4159574, ultrasonic cleaning was conducted for 2 minutes with rotating the barrel with a rotating speed of 3 rpm and with generating ultrasonic waves of 25 kHz using an ultrasonic transducer placed in the degassed water, and thus smuts attached to the surfaces of the magnets were removed.

After taking the barrel out of the degassed water, it was immersed in an electrolytic copper plating bath (copper sulfate: 60 g/L, EDTA·2Na: 150 g/L, pH: 12.5 and the liquid temperature: 50° C.), an electrolytic plating treatment was conducted for 2 hours with rotating the barrel with a rotating speed of 3 rpm and with a current density of 0.3 A/dm$^2$. A copper plating film with the film thickness of 10 μm was formed on the surfaces of the magnets.

Comparative Example 4

Except that smuts were removed by conducting an electrolytic treatment according to Patent Document 1, a copper plating film was formed on the surfaces of the magnets similarly to Example 2. The electrolytic treatment was conducted for 3 minutes by immersing the barrel in an alkaline electrolytic solution (sodium hydroxide: 70 g/L, sodium carbonate: 30 g/L, phosphate: 10 g/L and the liquid temperature: 30° C.) and with rotating the barrel with a rotating speed of 3 rpm, and with a current density of 3 A/dm$^2$.

Example 3

Except that an electrolytic plating treatment was conducted using an electrolytic copper plating bath (the liquid temperature: 42° C.), in which the pH was adjusted to 11.5 by adding sodium hydroxide to an electrolytic copper plating solution of OKUNO CHEMICAL INDUSTRIES CO., LTD. (trade name: Soft Copper). A copper plating film was formed on the surfaces of the magnets similarly to Example 2.

(Evaluation of Smut Removal Ratio and Adhesiveness of Plating Film)

Figure 2:
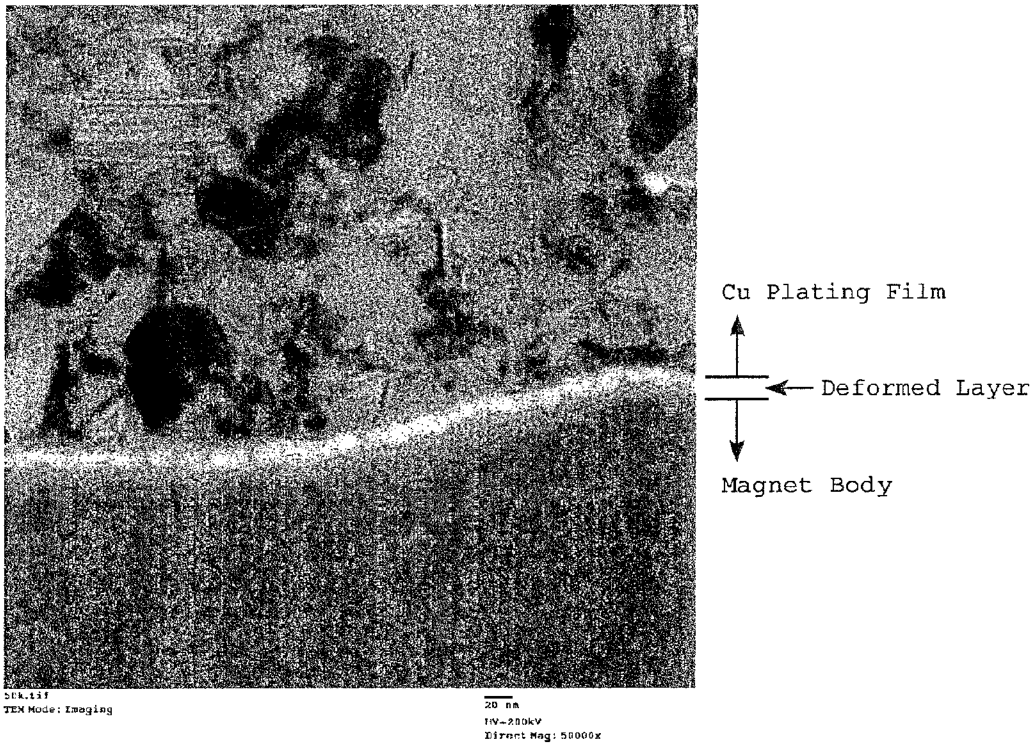
FIG. 2 It is a cross-section picture by a transmission electron microscope around the boundary surface of the magnet body and the copper plating film of the magnet of Comparative Example 4.

The evaluation of the smut removal ratio and the adhesiveness of the plating film of each of Example 1 to Example 3 and Comparative Example 1 to Comparative Example 4 was conducted. The smut removal ratio was calculated, after firmly attaching cellophane tape having a predetermined size on the surface of the magnet, removing it and then measuring its weight, regarding 10 magnets taken at random from the barrel in the stage after the acid cleaning and 10 magnets taken at random from the barrel in the stage after the smut removal respectively, and using the calculation formula (1−((average tape weight after smut removal−average weight of tape itself)/(average tape weight after acid cleaning−average weight of tape itself)))×100(%). The adhesiveness of the plating film was measured regarding 10 magnets after the plating treatment using the measuring device: Sevastian V of Quad Group Inc., and the average value was calculated. The results are shown in Table 1. As seen clearly from Table 1, in Example 1 to Example 3, excellent smut removal ratio and adhesiveness of the plating film were achieved. However, in Comparative Example 1 and Comparative Example 4, although the smut removal ratio was excellent, the adhesiveness of the plating film was far inferior compared with that of Example 1 to Example 3. The smut removal ratio and the adhesiveness of the plating films in Comparative Example 2 and Comparative Example 3 were far inferior compared with those of Example 1 to Example 3. The results of the observation of a cross-section around the boundary surface of the magnet body and the copper plating film of the magnet after the plating treatment of Example 2 and Comparative Example 4 using a transmission electron microscope (Hitachi High-Technologies Corporation: HF-2100) are shown in FIG. 1 and FIG. 2, respectively (magnification: 50000 diameters). As seen clearly from FIG. 1 and FIG. 2, regarding both magnets, a non-crystalline deformed layer exists at the boundary surface of the magnet body and the copper plating film (the layer thickness of the deformed layer is about 10 nm to 80 nm, and it is confirmed by X-ray diffraction analysis that the layer is non-crystalline). The deformed layer which the magnet of Example 2 had was of a dense structure without a void, while the deformed layer which the magnet of Comparative Example 4 had was of a structure having many voids which were thought to be caused by oxide film or hydroxide film formed on the surface of the magnet during the smut removal. The difference in the adhesiveness of the plating film of both magnets was considered to be caused by the structural difference of the deformed layer.

TABLE 1

| | Smut removal method | Smut removal ratio (%) | Kind of plating film | Film adhesiveness (N/mm$^2$) |
|---|---|---|---|---|
| Example 1 | Ultrasonic cleaning in degassed water having dissolved oxygen amount of 4 ppm | 98 | Nickel | 60 |
| Comparative Example 1 | Electrolytic treatment according to Patent Document 1 | 95 | " | 35 |
| Comparative Example 2 | Ultrasonic cleaning in ion-exchanged water (dissolved oxygen amount of 8 ppm) | 35 | " | 20 |
| Comparative Example 3 | Ultrasonic cleaning in water having dissolved oxygen amount of 3 ppm by Ar gas substitution | 35 | " | 20 |
| Example 2 | Ultrasonic cleaning in degassed water having dissolved oxygen amount of 3 ppm | 98 | Copper | 80 |
| Comparative Example 4 | Electrolytic treatment according to Patent Document 1 | 95 | " | 15 |
| Example 3 | Ultrasonic cleaning in degassed water having dissolved oxygen amount of 3 ppm | 98 | " | 80 |

Reference Example 1

The relation of the dissolved oxygen amount in degassed water for the ultrasonic cleaning and the smut removal ratio was studied by conducting similar processes as in Example 1. The results are shown in Table 2. As seen clearly from Table 2, the high smut removal ratios of 80% or more were achieved when the dissolved oxygen amounts were 6 ppm or less, and in particular, the results were excellent when the dissolved oxygen amounts were 3 ppm to 4 ppm. However, the smut removal ratio deteriorated remarkably when the dissolved oxygen amount exceeded 6 ppm. This was considered to be caused because the ultrasonic energy propagation was severely prevented and reduced because the dissolved oxygen amount was high.

TABLE 2

| | Dissolved oxygen amount (ppm) | Smut removal ratio (%) |
|---|---|---|
| Condition 1 | 0.1 | 85 |
| Condition 2 | 1 | 90 |
| Condition 3 | 2 | 95 |
| Condition 4 | 3 | 98 |
| Condition 5 | 4 | 97 |
| Condition 6 | 5 | 85 |
| Condition 7 | 6 | 83 |
| Condition 8 | 7 | 57 |
| Condition 9 | 8 | 33 |

Reference Example 2

The relation of the oscillation frequency for the ultrasonic cleaning and the smut removal ratio was studied by conducting similar processes as in Example 1. The results are shown in Table 3. As seen clearly from Table 3, the smut removal ratio improved when the oscillation frequency became smaller. High smut removal ratios of 90% or more were achieved when the oscillation frequencies were 38 kHz or less, and in particular, the results were excellent when the oscillation frequencies were 25 ppm to 27 ppm.

TABLE 3

| | Oscillation frequency (kHz) | Smut removal ratio (%) |
|---|---|---|
| Condition 1 | 25 | 98 |
| Condition 2 | 27 | 97 |
| Condition 3 | 38 | 92 |
| Condition 4 | 78 | 75 |
| Condition 5 | 100 | 70 |
| Condition 6 | 130 | 60 |

INDUSTRIAL APPLICABILITY

The present invention has an industrial applicability in that it can provide a production method for an R—Fe—B based sintered magnet having a plating film excellent in adhesiveness on the surface thereof, by conducting a series of processes of acid cleaning and smut removal as pretreatments of a plating treatment of an R—Fe—B based sintered magnet, and the subsequent plating treatment, effectively without causing trouble.

The invention claimed is:

1. A production method for an R—Fe—B based sintered magnet having a plating film on the surface thereof, wherein a series of processes of acid cleaning and smut removal of a magnet as pretreatments of a plating treatment, and the subsequent plating treatment is conducted consistently with a state, in which the magnet is placed in a barrel made of synthetic resin, and wherein the smut removal is conducted by ultrasonic cleaning of the magnet with rotating the barrel in water in which a dissolved oxygen amount is set to 0.1 ppm to 6 ppm by performing a degassing.

2. The production method described in claim 1, wherein an oscillation frequency of ultrasonic wave in the ultrasonic cleaning is set to 20 kHz to 100 kHz.

3. The production method described in claim 1, wherein the pH of a plating bath in the plating treatment is 9 or more.

* * * * *